United States Patent [19]
Fujihara et al.

[11] Patent Number: 4,902,101
[45] Date of Patent: Feb. 20, 1990

[54] AUTOMATIC FOCUSING METHOD

[75] Inventors: Tadafumi Fujihara; Yoshihiro Shimada, both of Tokyo, Japan

[73] Assignee: Olympus Optical Co., Ltd., Tokyo, Japan

[21] Appl. No.: 108,936

[22] Filed: Oct. 16, 1987

[30] Foreign Application Priority Data

Oct. 16, 1986 [JP] Japan .................................. 61-246188

[51] Int. Cl.$^4$ ............................................. G02B 27/00
[52] U.S. Cl. ..................................... 350/320; 350/521; 354/400
[58] Field of Search ............... 350/320, 500, 507, 518, 350/519, 521, 529, 530, 563; 354/400, 402; 358/227

[56] References Cited

U.S. PATENT DOCUMENTS 4,531,157  7/1985  Ishikawa .............................. 354/400
4,695,137  9/1987  Jörgens et al. ....................... 350/521

*Primary Examiner*—Bruce Y. Arnold
*Assistant Examiner*—Loha Ben
*Attorney, Agent, or Firm*—Cushman, Darby & Cushman

[57] ABSTRACT

An automatic focusing apparatus of a peak stop system adapted to perform focusing adjustment by: measuring contrast while moving stepwise an objective lens or an object in a direction of a focal point along an optical axis of the objective lens with a certain pitch width from a reference point to store the contrast measured at each position during the movement into a memory: comparing a difference between the contrast value measured at a present position where the objective lens or the object has been just moved and the contrast value stored at each position where the objective lens or the object has been already moved, with a preset judgment value; and judging that the position of the maximum contrast (the focal point) has been passed in relation to the gradual movement with the above pitch width when each of compared results is a positive value at each position, in order to make it possible to detect accurately the position of the maximum contrast, disregarding sub-peaks of the contrast.

7 Claims, 4 Drawing Sheets m-TIMES MOVEMENT OF OBJECTIVE

NUMBER OF MOVEMENT OF OBJECTIVE

AUTOMATIC FOCUSING METHOD

BACKGROUND OF THE INVENTION (a) Field of the invention

The present invention relates to an automatic focusing method peculiarly suitable for microscopes.

(b) Description of the Prior Art

An automatic focusing method which has been applied in the past to optical apparatus such as microscopes is that focus is taken by adjusting a distance between a specimen or an object to be photographed and an objective lens in such a manner as to maximize the extent of contrast secured by the differentiation or integration of a projection luminance signal issued from a TV camera or an image pickup device such as a line scanning type solid-state image sensor. Such a method includes three systems described below:

(1) Fully scanning system

This is the system for taking the focus by shifting completely the position of an objective lens or an object (specimen) in the range of the distance between a front focus and a rear focus to store the position where the maximum contrast is brought about within this shift range, and then setting the objective lens or the object at the position of the maximum contrast.

(2) Peak stop system

This is the system for taking the focus by moving the objective lens or the object from the position of the front focus and stopping the movement of the objective lens or the object at the position where the contrast is maximized.

(3) Climbing servo system

This is the system for taking the focus by moving the objective lens or the object and then stopping its movement at the position where the contrast is no longer varied in such a manner as to move first the objective lens or the object in an arbitrary direction, to make a comparison between contrast values before and after the movement, and then to move the objective lens or the object in the same direction if the contrast value is increased after the movement and in the reverse direction if decreased.

Of the above systems, systems (2) and (3) are generally used. In fact, however, since a number of sub-peaks of the contrast exist in addition to the peak of the maximum contrast of the focusing position, these systems have encountered a problem that, when automatic focusing adjustment is performed, the positions of the sub-peaks are determined in mistake as the focusing position and consequently the automatic focusing operation is stopped, that is, malfunction is liable to occur.

SUMMARY OF THE INVENTION

In view of the above problem, it is the object of the present invention to provide an automatic focusing method capable of detecting accurately the position of the maximum contrast, that is, the focusing position, independently of the sub-peaks of the contrast.

According to the present invention, this object is accomplished by implementing; (a) a step for measuring the contrast while moving step by step an objective lens or an object along an optical axis of the objective lens in a normal direction (that is, in a direction that the objective lens and the object are separate from each other) with a certain pitch width from a reference point and for storing the extent of the contrast at each position of the objective lens or the object during the movement; (b) a step for comparing a difference between the contrast at a position where the objective lens or the object has been just moved and the contrast stored at each position where it has been already moved, with a preset decision value; and (c) a step for determining that, if all the results of these comparisons have positive values at respective positions described above, the position of the maximum contrast has been already passed in the gradual movement with a certain pitch width.

According to a preferred formation of the present invention, the arrangement is made so that, after the performance of the above step (c), focusing adjustment is effected by; (d) a step for returning the objective lens or the object to a position shifted for one pitch in the normal direction from the position of the maximum contrast and then moving the objective lens or the object with the pitch width smaller than that mentioned above, in the reverse direction, to implement steps similar to the above steps (a) to (c); and (e) a step for repeating the above steps (a) to (d) until a preset minimum pitch width below a depth of focus can be applied. Thereby, even if the sub-peaks are included in the contrast, a real peak value can be determined and the automatic focusing adjustment with a high degree of accuracy can be performed.

According to another preferred formation of the present invention, the arrangement is made so that, after the completion of the above step (c), the focusing adjustment can be carried out by; (k) a step for returning the objective lens or the object to a forward position shifted in the normal direction for one pitch from the position of the maximum contrast and then moving step by step the objective lens or the object while measuring the contrast, in the reverse direction, for the preset number of movements with the pitch width smaller than that mentioned above, or to a position with a contrast value below that of the above forward position and closest to this value, among the values of the contrast stored by step (a); (l) a step for using the value of the maximum contrast measured in the process of this movement and the values of the contrast at the positions shifted for one pitch in the normal and reverse directions from the measured position to calculate the focusing position from the approximate expression of interpolation; and (m) a step for making a change to set the position of the objective lens or the object at the focusing position thus calculated. Thereby, time for bringing into focus can be reduced.

According to still another preferred formation, if a limit position for the movement of the objective lens or the object is set on the side opposite to the reference point and it has been unable to be determined that the position of the maximum contrast has been passed in the process for carrying out the above step (c), the arrangement is such that the focusing adjustment is effected by; (f) a step for determining the value of the maximum contrast in the gradual movement with the first pitch width to compare it with the preset value; (g) a step for repeating steps (a) to (c) using a second pitch width smaller than the first pitch width; (h) a step for repeating steps (a) through (g) to determine a minimum pitch width smaller than the depth of focus; (i) a step for implementing steps (g) and (h) when the maximum contrast value is larger than the preset value; and (j) a step for carrying out steps (a) to (h) with the pitch width smaller than that in step (f), regarding the limit position or the reference position as a second reference point, when the maximum contrast value is smaller than the preset value. Thereby, even in the case of the object with low contrast, the automatic focusing adjustment can be performed with accuracy.

This and other objects as well as the features and advantages of the present invention will be apparent from the following detailed description of the preferred embodiments when taken in conjunction with the accompanying drawings.

DESCRIPTION OF THE PREFERRED EMBODIMENTS

The present invention will be described in detail below, based on each embodiment illustrated.

Figure 1:
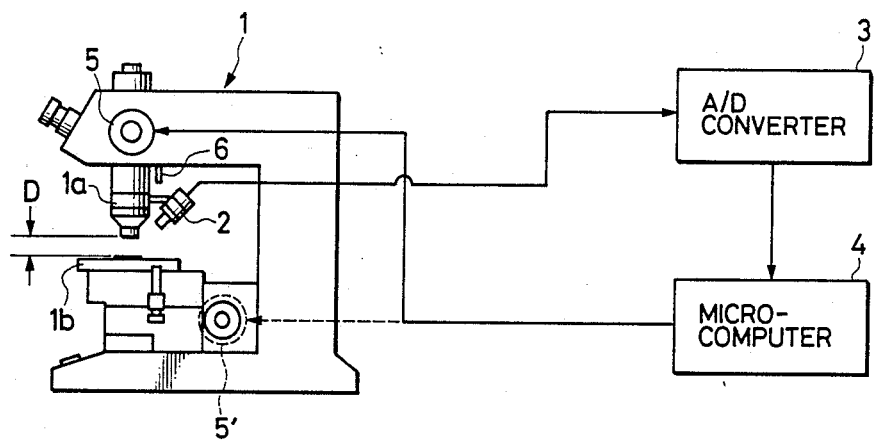
FIG. 1 is a view showing a basic structure of an automatic focusing apparatus used for the method according to the present invention.

FIG. 1 is a view showing a basic structure of an automatic focusing apparatus used for the method according to the present invention, in which projection luminance signals outputted from a line scanning type solid-state image pickup device 2 (for example, a CCD camera) attached to a tube 1a of a microscope 1 are inputted into a microcomputer 4 through an A/D converter, and an absolute value of a difference value between the pixels adjacent to each other among the projection luminance signals produced by solid-state image pickup elements in the line scanning type solid-state image pickup device 2 is determined with respect to all of the pixels of a horizontal scanning line to obtain the total of each absolute value. This total value is decided as contrast. The above operation is performed while the objective lens 1a or a table (object) 1b of the microscope 1 is gradually moved by a driving motor (a pulse motor) 5 through a known mechanism and, based on contrast information obtained thereby, the pulse motor 5 is controlled by the computer 4 so that a distance D between the objective lens 1a and the object (specimen) 1b is adjusted to secure a focal point (FP). The line scanning type solid-state image pickup device, that is, the focusing optical system 2 may be incorporated in an optical system in the body of the microscope 1.

Figure 2:
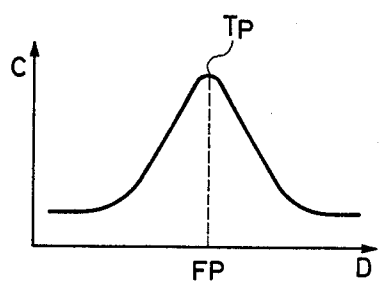
FIGS. 2 and 3 are graphs showing the relationship between the contrast and the objective-to-specimen distance in the case of the contrast with only one peak and in the case of the contrast with a plurality of sub-peaks, respectively.
Figure 3:
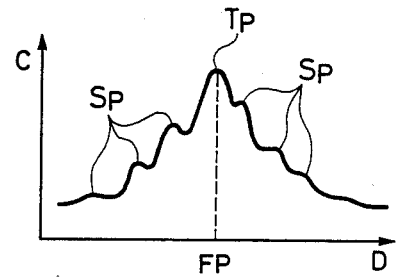

In FIGS. 2 and 3 are shown curves indicative of the relationship between the contrast C and the objective-to-specimen distance D. FIG. 2 shows an ideal case of the contrast with only one peak Tp and, in such a case, the focusing adjustment can be performed with accuracy in a simple manner. In fact, however, a contrast curve with a plurality of sub-peaks Sp is brought about as depicted in FIG. 3, with the result that, in the conventional method, the sub-peaks Sp have ever been regarded in error as the position of the maximum contrast, that is, the focal point FP.

Thus, the method according to the present invention has solved the problems of the conventional method by improving, as described below, the movement for adjusting the distance between the objective lens and the specimen and the comparison with the contrast.

Figure 4:
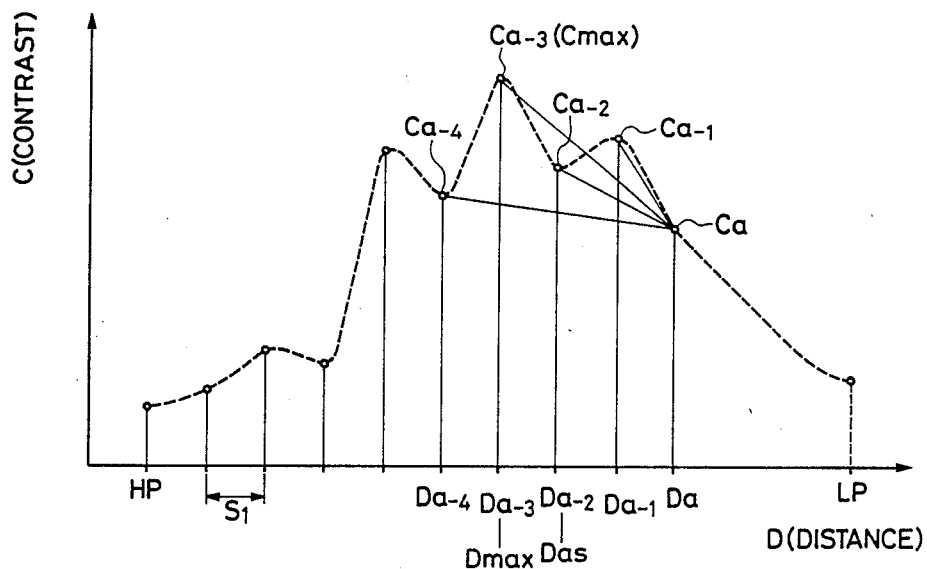
FIG. 4 is a view showing the principle of a returning method of a first embodiment of the method according to the present invention.

At the beginning, a first embodiment is explained. As shown in FIG. 4, the pulse motor 5 starts to be driven from an original point HP arbitrarily set at the position (the front focus) located on the object side from the focal point and, while the objective lens 1a is continually moved step by step with a predetermined pitch width $S_1$ in a direction (normal direction) of the focal point FP, the contrast is measured at each step so that the data of the measured positions $D_a$, $D_{a-1}$, ... and the contrast values $C_a$, $C_{a-1}$, at the positions thereof are inputted into the memory of the microcomputer 4. Then, the contrast values $C_{a-n}$ (the data stored already) corresponding to the plural positions $D_{a-n}$ in the range including the predetermined number of steps n in a direction opposite to the normal direction (that is, in the reverse direction) from the present position $D_a$ are fetched from the memory of the computer 4 to compare the extent of the contrast values on the basis of the position $D_a$. This can be expressed by an equation as follows:

$$\Delta C_{na} = C_{a-n} - C_a \; (n = 1, 2, \ldots, n)$$

Figure 5:
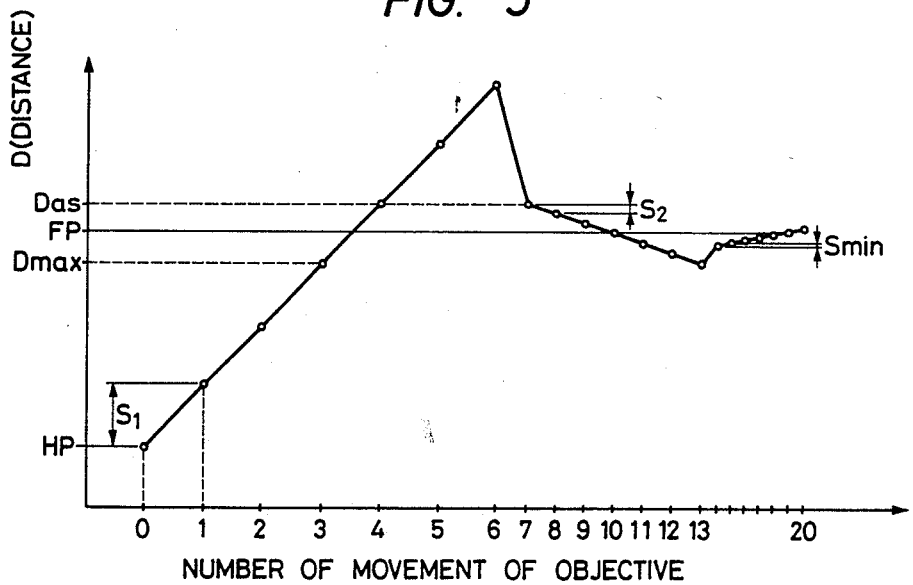
FIG. 5 is a view showing the process of the first embodiment.

If the entire value of $\Delta C_{na}$ is larger than a preset judgment value $\epsilon$ ($\epsilon \geq 0$), it indicates that the present position is located in a descending portion of the contrast curve and consequently it can be judged that the position of the maximum contrast has been passed while the object is stepwise moved with the pitch width $S_1$. After this, as shown in FIG. 5, the objective lens 1a is returned at a time to the position $D_{as}$ ($D_{as} = D_{a\,max} + S_1$, on the $D_a$ side) where the position of the contrast $C_a$ is shifted in the normal direction for one pitch from the maximum position $D_{a\,max}$ ($C_a = C_{a\,max}$), among the positions $D_a$ where the objective lens has been stepwise moved, and then the same operation as mentioned above is performed with the pitch width smaller than the pitch width $S_1$ in the direction of the focal point (that is, in a direction opposite to the normal direction). Then, after the above operation is continually carried out by repetition until the preset minimum pitch width below the depth of focus can be applied, the operation is completed and the position where the objective lens is stopped at last becomes the focal point. According to this method, therefore, the sub-peaks of the contrast are disregarded, so that a real peak value can be attained and an automatic focusing adjustment can be made with accuracy. Here, FIG. 4 shows the position (this judgment condition is that all of $C_{a-1}-C_a$, $C_{a-2}-C_a$, $C_{a-3}-C_a$, and $C_{a-4}-C_a$ are larger than the judgment value $\epsilon$) $D_a$ where it is judged that the position of the maximum contrast has been passed with the pitch width $S_1$ and the number of return steps n (=4). Further, FIG. 5 indicates a process to obtain the focal point while the pitch width is changed. Also, the judgment value $\epsilon$ and the number of return steps n need to be changed in consideration of contrast variations when the pitch width S is varied and their practical values depend on contrast data of the sample and the data of electrical noises (the scatter of the contrast).

The method of determining the extent of the contrast while returning the objective lens as stated above is hereinafter abbreviated to "a return method".

Figure 6:
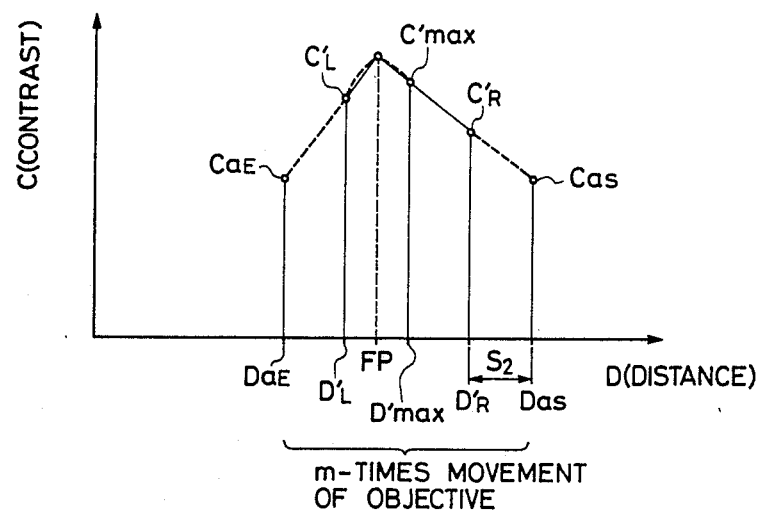
FIG. 6 is a view showing the principle of interpolation in second and third embodiments.
Figure 7:
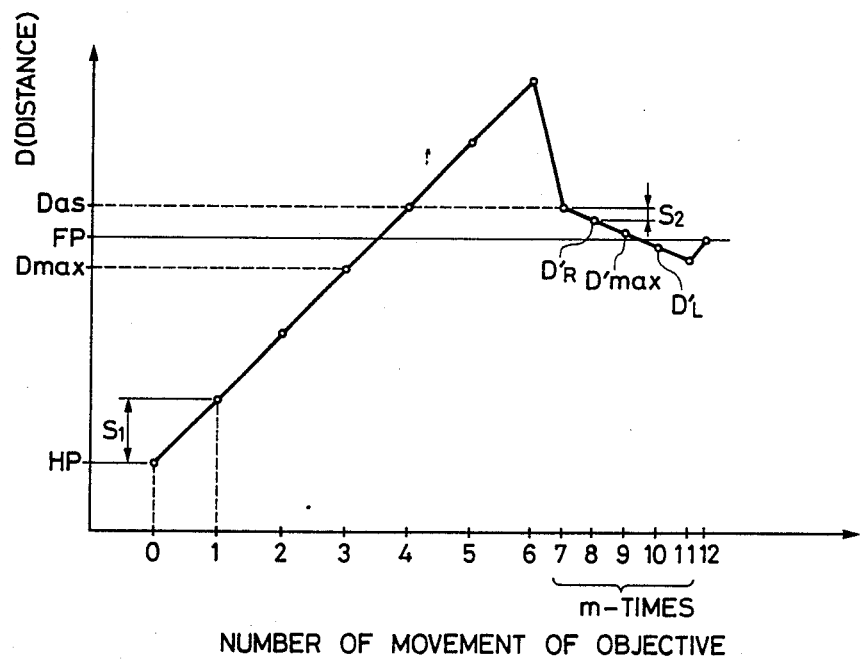
FIG. 7 is a view showing the process of the second embodiment.

Next, a second embodiment which is a modification of the first embodiment is described. The method according to this embodiment is to reduce the time for bringing into fucus and is explained in conjuction with FIGS. 6 and 7. First, the return method with the pitch width $S_1$ is used and after the position $D_{as}$ (see FIG. 4) where the position of the contrast $C_a$ is shifted in the normal direction for one pitch from the maximum position $D_{max}$ is determined, the objective lens $1a$ is moved to this position. Then, as depicted in FIGS. 6 and 7, the objective lens is moved for a preset number of return steps m while the contrast is measured with the pitch width $S_2$ smaller than the pitch width $S_1$ in the direction of the focal point (that is, in a direction opposite to the normal direction) from the above position $D_{as}$ as a starting point (this movement of the objective lens is hereinafter referred to as an indication movement). After the indication movement is completed, from the maximum contrast $C'_{max}$ (this position is $D'_{max}$) produced in the gradual movements of m times and the contrast values $C'_L$, $C'_R$ corresponding to the positions $D'_L$, $D'_R$ ($D'_L = D'_{max} - S_2$; $D'_R = D'_{max} + S_2$) existing on opposite sides of the position $D'_{max}$, the focal point FT is calculated by the approximate expression of interpolation and then the objective lens is moved to the calculated focal point. For the interpolation, various methods are known and, as a result of the implementation of the present invention, it has found that even the simplest linear approximation can bring about adequate results, so that only linear approximate equations are described below:

When $C'_L \geqq C'_R$, $$FP = D'_{max} - \frac{C'_L - C'_R}{2(C'_{max} - C'_R)} S_2;$$

When $C'_L \leqq C'_R$, $$FP = D'_{max} + \frac{C'_R - C'_L}{2(C'_{max} - C'_L)} S_2$$

Although there are indications that the return method is applied only in relation to the movement with the pitch width $S_1$ in this embodiment, it is only necessary for the improvement of focusing accuracy to employ a method of increasing the number of applications of the return method (applied also in respect of the movement with the pitch width $S_2$ ($<S_1$), for example) and/or a method of applying the interpolation while increasing the number of application of the above indication movement and to enhance resolution by setting a pitch width smaller than the pitch width $S_1$.

Next, as a third embodiment, description is given in relation to a method of securing the focal point by determining automatically the number of return steps m of the indication movement in the second embodiment. First of all, the return method with the pitch width $S_1$ is conducted to determine the positon $D_{as}$ (see FIG. 4) where the position of the contrast $C_a$ is shifted in the normal direction for one pitch from the maximum position $D_{max}$, followed by the movement of the objective lens $1a$ to this position. Then, the objective lens $1a$ is further moved to the following position $D_{aE}$ while the contrast is measured, with the pitch width $S_2$ smaller than the pitch width $S_1$ in the direction of the focal point FP (that is, in a direction opposite to the normal direction) from the position $D_{as}$ as a starting point. That is to say, as shown in FIG. 6, the position $D_{aE}$ is the position with contrast value $C_{aE}$ which is smaller than the contrast value $C_{as}$ corresponding to the position $D_{as}$ and which is closest to the contrast value $C_{as}$, among the contrast values $C_a$ stored by carrying out the return method with the pitch width $S_1$. After this the interpolation descirbed in the second embodiment is applied to the third embodiment and the focal point FP is obtained in the same manner as in the second embodiment.

Figure 8:
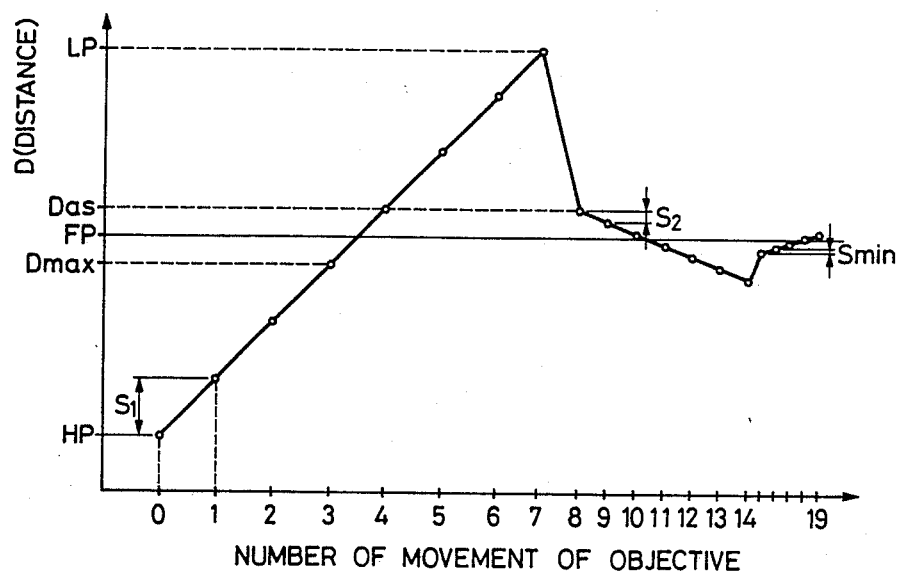
FIGS. 8 and 9 are views showing the processes of a fourth embodiment in the cases of the maximum contrast larger than the preset contrast and smaller, respectively.

Next, as a fourth embodiment, a method of focusing a specimen with low contrast in particular is explained below. Generally, in the case of the specimen with low contrast, the difference between the contrast values is smaller than the judgment value and a peak width is also smaller, so that the position $D_{max}$ corresponding the maximum contrast $C_{max}$ may be unable to be determined by the return method (with pitch width $S_1$) at the first time. The automatic focusing method in such a case is as follows: A device 6 (FIG. 1) for detecting a preset limit position LP (a position located on the rear focus side from the focal point, that is, the position LP shown in FIG. 4) is previously provided in the microscope apparatus and, after the limit position LP is detected, the maximum contrast $C_{max}$ in the positions $D_a$ where the objective lens has been already stepwise moved is determined. If the value $C_{max}$ is larger than a preset contrast value Ct, the objective lens is moved to the position $D_{as}$ shifted in the normal direction for one pitch from the position $D_{max}$ of the maximum contrast $C_{max}$ among the positions $D_a$ where the objective lens has been already stepwise moved as in the first to the third embodiment and then the focal point is determined in the same manner as in the first to the third embodiment. A focusing process of the above method applied to the first embodiment is shown in FIG. 8.

Figure 9:
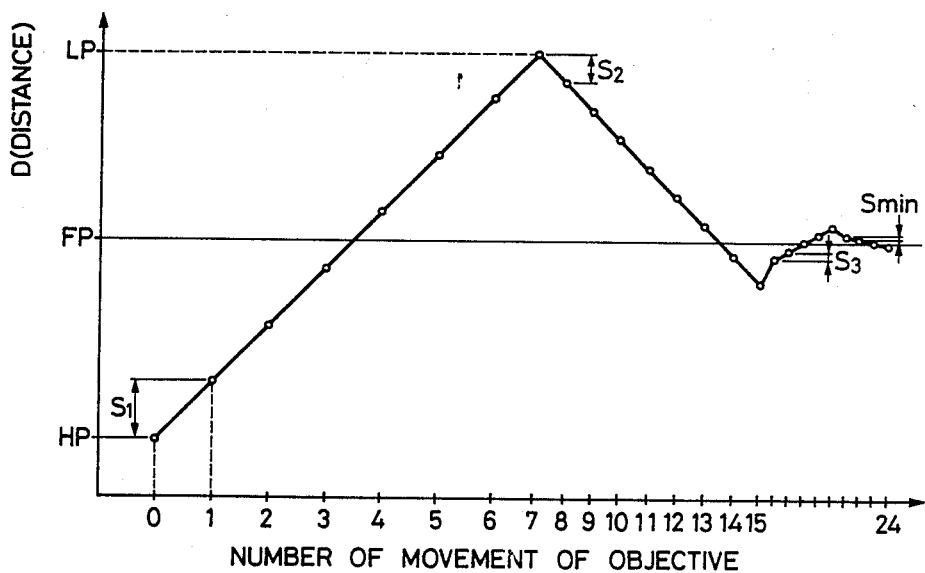

On the other hand, if the contrast $C_{max}$ is smaller than the preset contrast Ct, the limit position LP is decided as a false original point and the pitch width is reset to $S_2$ smaller than $S_1$ to carry out the return method again. After this, the focal point is determined in the same way as in the first to the third embodiment. A focusing process of this method applied to the first embodiment is shown in FIG. 9. This embodiment provides the limit position LP as a false original point to bring into refocus. In such a case as a specimen with a certain thickness, however, a focus will be taken on the back surface of the specimen and therefore the embodiment will profit from focusing operation relative to the same surface (for example, the front surface) by setting the false original point to the real original point HP at the first time.

Although, in the above description, the objective lens is moved to adjust the distance D between the objective lens and the specimen, it is needless to say that the same results are secured by the operation that the microcomputer 4 is connected to a motor 5', as indicated by a dotted line in FIG. 1, in such a manner that the component of the specimen side is moved.

Further, the driving motor 5, 5', described as a pulse motor, may be arranged as other DC motor and, if the electrical signals of the line scanning type image pickup device 2, the A/D converter 3 and the microcomputer 4 can be processed at high speed, the focusing operation of continuous movement, instead of the gradual movement, is available.

Also, in case the electrical noise is high and the contrast is scattered, the focal point with a high degree of accuracy can be determined in such a manner that the measurement of the contrast is made plural times at the same position and means operation is performed to thereby obtain the contrast which has little scatter.

Although the above description has been made of the instances applied to microscopes, it is needless to say that the present invention is also applied to other optical apparatus.

What is claimed is:

1. An automatic focusing method of bringing into focus by adjusting a distance between an object and an objective lens so that the maximum contrast of the object is brought about, comprising the steps of:
    (a) measuring contrast while moving stepwise one of said object and said objective lens along an optical axis of said objective lens in a normal direction with a first constant pitch width from a reference point and storing the contrast at each position where one of said object and said objective lens has been moved;
    (b) comparing a difference between a contrast value measured at a present position where one of said object and said objective lens has been just moved and a contrast value stored at each position where one of said object and said objective lens has been already moved, with a preset judgment value; and
    (c) judging that a position of the maximum contrast has been passed in relation to operation with said first pitch width when each of comparison results obtained by said step (b) is a positive value.

2. An automatic focusing method according to claim 1, further comprising the steps of, after the accomplishment of said step (c):
    (d) returning a position of one of said object and said objective lens to a position shifted in the normal direction for said first pitch width from the position of the maximum contrast and then practicing said steps (a) to (c), instead of with said first pitch width, with a second pitch width smaller than said first pitch width in a reverse direction; and
    (e) repeating the operation of said steps (a) to (d) until a preset minimum pitch width smaller than a depth of focus is applied.

3. An automatic focusing method according to claim 1, further comprising the steps of:
    (f) determining the value of the maximum contrast in the gradual movement with said first pitch width to compare it with a preset value;
    (g) returning a position of one of said object and said objective lens to a position shifted in the normal direction for said first pitch width from the position of the maximum contrast value and then practicing said steps (a) to (c), instead of with said first pitch width, with a second pitch width smaller than said first pitch width in a reverse direction;
    (h) repeating the operation of said steps (a) to (g) until a present minimum pitch width smaller than a depth of focus is applied;
    (i) carrying out the operation of said steps (g) and (h) when a limit position for the movement of one of said object and said objective lens is set on the side opposite to said reference point and it has been unable to determine that the position of the maximum contrast has been passed in the process for carrying out said step (c) and when the maximum contrast determined in said step (f) is larger than said present value; and
    (j) carrying out the operation of said steps (a) to (h), instead of with said first pitch width, with a pitch width smaller than said first pitch width, using said limit position as said reference point when said limit position is set on the side opposite to said reference point and it has been unable to determine that the position of the maximum contrast has been passed in the process for carrying out said step (c) and the value of the maximum contrast obtained in said step (f) is smaller than said preset value.

4. An automatic focusing method according to claim 1, further comprising the steps of, after the accomplishment of said step (c):
    (k) returning a position of one of said object and said objective lens to a position shifted in the normal direction for said first pitch width from the position of the maximum contrast and then moving one of said object and said objective lens for a preset number of steps with a second pitch width smaller than said first pitch width in a reverse direction while measuring the contrast;
    (l) using the value of the maximum contrast measured during a gradual movement in said step (k) and the values of the contrast at positions shifted for said second pitch width in normal and reverse directions from the position of said maximum contrast to calculate a focal point from an approximate expression of interpolation; and
    (m) making a change to set the position of one of said object and said objective lens at the position calculated in said step (l).

5. An automatic focusing method according to claim 4, further comprising the steps of:
    (f) determining the value of the maximum contrast in the gradual movement with said first pitch width to compare it with a preset value;
    (n) carrying out the operation of said steps (k) to (m) when a limit position for movement of one of said object and said objective lens is set on the side opposite to said reference point and it has been unable to determine that the position of the maximum contrast has been passed in the process for carrying out said step (c) and when the value of the maximum contrast determined in said step (f) is larger than said preset value; and
    (o) carrying out the operation of said steps (a) to (c) and (k) to (m), instead of with said first pitch width, with a pitch width smaller than said first pitch width, using said limit position as said reference point when said limit position is set on the side opposite to said reference point and it has been unable to determine that the position of the maximum contrast has been passed in the process for carrying out said step (c) and when the value of the maximum contrast obtained in said step (c) is smaller than said present value.

6. An automatic focusing method according to claim 1, further comprising the steps of, after the accomplishment of said step (c):
    (p) returning a position of one of said object and said objective lens to a position shifted in the normal direction for said first pitch width from the position of the maximum contrast and then moving one of said object and said objective lens with a second pitch width smaller than said first pitch width in a reverse direction while measuring the contrast, to the position with a contrast value which is smaller than the contrast value at said shifted position and which is closest to said contrast value among the contrast values stored in said step (a);

(g) using the value of the maximum contrast measured during a gradual movement in said step (p) and the values of the contrast at positions shifted for said second pitch width in normal and reverse directions from the position of said maximum contrast to calculate a focal point from an approximate expression of interpolation; and (r) making a change to set the position of one of said object and said objective lens at the position calculated in said step (g).

7. An automatic focusing method according to claim 6, further comprising steps of:

(f) determining the value of the maximum contrast in the gradual movement with said first pitch width to compare it with a preset value;

(s) carrying out the operation of said steps (p) to (r) when a limit position for movement of one of said object and said objective lens is set on the side opposite to said reference point and it has been unable to determine that the position of the maximum contrast has been passed in the process for carrying out said step (c) and when the value of the maximum contrast determined in said step (f) is larger than said preset value; and (t) carrying out the operation of steps (a) to (c) and (b) to (r), instead of with said first pitch width, with a pitch width smaller than said first pitch width, using said limit position as said reference point when said limit position is set on the side opposite to said reference point and it has been unable to determine that the position of the maximum contrast has been passed in the process for carrying out said step (c) and when the value of the maximum contrast obtained in said step (g) is smaller than said preset value.

* * * * *

UNITED STATES PATENT AND TRADEMARK OFFICE
CERTIFICATE OF CORRECTION

PATENT NO. : 4,902,101

DATED : February 20, 1990

INVENTOR(S) : Tadafumi FUJIHARA and Yoshihiro SHIMADA

It is certified that error appears in the above-identified patent and that said Letters Patent is hereby corrected as shown below:

Claim 7, Col. 10, line 14, change "(b)" to -- (p) --.

Signed and Sealed this

Thirtieth Day of July, 1991

Attest:

HARRY F. MANBECK, JR.

Attesting Officer          Commissioner of Patents and Trademarks